United States Patent
Vinegar et al.

(10) Patent No.: US 12,554,037 B2
(45) Date of Patent: Feb. 17, 2026

(54) MUON TOMOGRAPHY FOR SUBSURFACE STRUCTURE DETECTION USING HORIZONTAL BOREHOLE

(71) Applicant: VINEGAR TECHNOLOGIES LLC, West Lake Hills, TX (US)

(72) Inventors: Harold Vinegar, West Lake Hills, TX (US); Eva Vinegar, West Lake Hills, TX (US)

(73) Assignee: Vinegar Technologies, LLC, West Lake Hills, TX (US)

( * ) Notice: Subject to any disclaimer, the term of this patent is extended or adjusted under 35 U.S.C. 154(b) by 0 days.

(21) Appl. No.: 18/790,565

(22) Filed: Jul. 31, 2024

(65) Prior Publication Data

US 2025/0377475 A1 Dec. 11, 2025

Related U.S. Application Data

(60) Provisional application No. 63/657,015, filed on Jun. 6, 2024.

(51) Int. Cl.
| | |
|---|---|
| *G01V 5/04* | (2006.01) |
| *E21B 7/04* | (2006.01) |
| *E21B 23/00* | (2006.01) |
| *E21B 43/10* | (2006.01) |

(52) U.S. Cl.
CPC ............... *G01V 5/04* (2013.01); *E21B 7/046* (2013.01); *E21B 23/001* (2020.05); *E21B 43/10* (2013.01)

(58) Field of Classification Search
CPC ......... G01V 5/04; E21B 23/001; E21B 7/046; E21B 43/10
See application file for complete search history.

(56) References Cited

U.S. PATENT DOCUMENTS

| | | | | |
|---|---|---|---|---|
| 4,504,438 A | * | 3/1985 | Levy | G01V 5/04 376/156 |
| 5,450,902 A | * | 9/1995 | Matthews | E21B 43/122 166/372 |
| 10,444,395 B1 | * | 10/2019 | Vinegar | G01V 3/40 |

(Continued)

OTHER PUBLICATIONS

ParaTrack—2 Guidance (https://primehorizontal.com/wp-content/uploads/2024/10/Paratrack2.pdf) (Year: 1999).*

(Continued)

*Primary Examiner* — Taras P Bemko
(74) *Attorney, Agent, or Firm* — Momentum IP; Marc Van Dyke (57) ABSTRACT

A method and apparatus for detecting underground structures using muon tomography in conjunction with a horizontal borehole. The system involves drilling or tunneling a horizontal borehole beneath the expected subsurface substructure depth, deploying multiple muon detector units within the borehole, equipment for moving the detector sonde along the borehole, recording data, and analyzing the detected muon flux to identify anomalies indicative of tunnels. The muon detectors, configured as tubular bundles of scintillators and drift tubes, detect muons with energies ranging from 10 GeV to 1 TeV and record the path of the muons. The system ensures borehole integrity and precise drilling alignment, providing a reliable means for subsurface structure detection.

29 Claims, 7 Drawing Sheets

(56) References Cited

U.S. PATENT DOCUMENTS

| | | |
|---|---|---|
| 10,585,208 B1* | 3/2020 | Yaish ................ G01V 5/04 |
| 12,085,689 B2 | 9/2024 | Schouten |
| 2008/0128604 A1* | 6/2008 | Bryman ............. G01T 1/203 |
| | | 250/266 |
| 2009/0157321 A1* | 6/2009 | Denichou ........... G01V 11/00 |
| | | 703/1 |
| 2011/0035151 A1* | 2/2011 | Botto ................ G01V 5/04 |
| | | 250/269.1 |
| 2023/0102216 A1* | 3/2023 | Schouten ........... H01J 47/008 |
| | | 250/358.1 |
| 2023/0258827 A1* | 8/2023 | Gauvreau ........... G01V 5/04 |
| | | 250/265 |
| 2025/0052149 A1* | 2/2025 | Schouten ........... E21B 17/042 |

OTHER PUBLICATIONS

"Muon tomography for detection of dynamic border tunnels" by L. Gebhart, D. Snowden-Ifft, Nuclear Inst. and Methods Qin Physics Research, A 1053 (2023) 168383 [Date: May 17, 2023].

Israel Seeks Underground Secrets by Tracking Cosmic Particles from Bloomberg Businessweek: [Date: May 31, 2024].

Muon detector for underground tomography by Benhammou at al from Journal "Nuclear Instruments and Methods in Physics Research Section A: Accelerators, Spectrometers, Detectors and Associated Equipment" [Date: Aug. 31, 2022].

The Physicists and Archaeologists Who Discovered: What Lies Beneath the Earth? from Globes.co.il [Date: Jun. 7, 2024].

* cited by examiner

MUON TOMOGRAPHY FOR SUBSURFACE STRUCTURE DETECTION USING HORIZONTAL BOREHOLE

FIELD OF THE INVENTION

The present invention relates to the field of detecting subsurface structures including tunnels, conduits and other underground construction using muon tomography units deployed in horizontal boreholes.

BACKGROUND OF THE INVENTION

Detecting underground structures has become a significant concern for infrastructure safety. Traditional methods for tunnel and conduit detection, such as ground-penetrating radar and seismic surveys, have limitations in terms of depth penetration, resolution, and ability to operate on-site. Muon tomography offers a non-invasive method to detect and characterize subsurface structures, utilizing cosmic muons' ability to penetrate deeply into the Earth.

SUMMARY OF THE INVENTION

The present invention provides a novel approach for tunnel detection by combining horizontal directional drilling or tunneling with muon radiography or tomography. The system involves drilling a horizontal borehole beneath the expected depth of the tunnels or conduits and deploying a series of muon detectors within the borehole. These detectors measure the flux of muons passing through the subsurface, enabling the identification of anomalies indicative of tunnels or conduits.

A method is disclosed, according to embodiments of the invention, for detecting a subsurface structure. The method comprises: (a) creating a horizontal borehole by tunneling or drilling; (b) deploying an array of one or more muon detector units within the horizontal borehole; (c) detecting muons characterized by respective energies ranging from 10 GeV to 1 TeV using the deployed muon detectors; and (d) analyzing flux of the detected muons to detect a subsurface structure located at a lesser depth than a depth of the horizontal borehole.

In some embodiments, the method can additionally comprise selecting a target depth of a target subsurface structure, and the creating of the horizontal borehole can be at a borehole depth below the target depth.

In some embodiments, the creating can comprise horizontal directional drilling (HDD). In some embodiments, the creating can comprise tunneling or micro-tunneling.

In some embodiments, the method can additionally comprise deploying tubing and/or casing within the borehole.

In some embodiments, the detected subsurface structure can be a tunnel or a conduit. In some embodiments, the detected subsurface structure can be a void.

In some embodiments, the muon detector array can be deployed using at least one of logging-while-drilling, coiled tubing conveyed, wireline-conveyed, drill pipe conveyed, and a pipeline inspection gauge (pig). In some embodiments, the muon detector array can be deployed using a pig, and the using of the pig includes providing access to collect a respective detector sonde at either end of the horizontal borehole. In some embodiments, the horizontal borehole can be cased with steel pipe, non-magnetic stainless-steel pipe, copper pipe, fiberglass pipe, or another suitable material to preserve borehole integrity and allow oilfield logging. In some embodiments the pipe may be coated on the inner surface to minimize friction and on the outer surface to minimize corrosion.

In some embodiments, the creating can comprise drilling the horizontal borehole from two ends and meeting between the two ends.

In some embodiments, the creating can include HDD and the drilling can include using a ParaTrack-2 guidance system with a magnetic coil on the surface to guide the drilling of the horizontal borehole.

In some embodiments, it can be that the borehole depth is selected to be sufficiently displaced vertically from the target depth of the target subsurface structure to reduce interference from surface activities and environmental noise, and to allow for destruction of the target subsurface structure without damaging the horizontal borehole.

In some embodiments, the array of one or more muon detector units can comprise a plurality of spaced-apart muon detector units.

In some embodiments, data from the muon detectors can be stored in one or more onboard systems and/or transmitted to a surface processing unit in real-time, using an electrical cable within the casing and/or tubing.

In some embodiments, the method can additionally comprise enhancing detection accuracy by using a high-resolution tomographic data inversion algorithm.

In some embodiments, the casing and/or tubing can comprise a material selected based on specific geological conditions of the subsurface environment.

In some embodiments, the one or more muon detectors can be calibrated to account for variations in muon flux due to changes in atmospheric conditions.

In some embodiments, the method can additionally comprise using a mobile platform to deploy and retrieve the muon detector array in a remote or inaccessible area. In some embodiments, the muon detectors can be designed to be resistant to high-pressure environments typically found in deep subsurface conditions. In some embodiments, the method can additionally comprise integrating use of the one or more muon detector units with at least one other geophysical surveying technique.

In some embodiments, the one or more muon detectors can be equipped with shielding to protect against background radiation and/or other sources of interference.

In some embodiments, the method can additionally comprise using a flexible deployment mechanism to adjust the positioning of the muon detectors based on real-time data analysis.

In some embodiments, the muon detector units can be powered by a self-sustaining energy source to ensure continuous operation over extended periods.

In some embodiments, the method can additionally comprise using a central monitoring station for coordinated analysis and decision-making to detect a subsurface structure.

In some embodiments, the method can additionally comprise deploying at least one additional sensor selected from acoustic, magnetic, induction, electromagnetic and gravity sensors, alongside muon detectors.

In some embodiments, the detecting of the subsurface structure can include detecting a subsurface structure under construction before the subsurface structure reaches a vertical plane intercepting a muon detector unit of the array of one or more muon detector units.

In some embodiments, the creating can include HDD, and the drilling can include (i) drilling a coplanar pair of horizontal boreholes at different respective borehole depths, and/or (ii) deploying a respective array of muon detector units in each of the boreholes, wherein the detected subsurface structure is at a lesser depth than one or both of the boreholes. In some embodiments, the creating can include HDD, and the drilling can include (i) drilling a coplanar pair of horizontal boreholes at different respective borehole depths below the target depth, and/or (ii) deploying a respective array of muon detector units in each of the boreholes.

In some embodiments, the method can additionally comprise enhancing the detection and/or depth accuracy by using a high-resolution tomographic data inversion algorithm using density or attenuation data from both boreholes.

In some embodiments, the drilling can include drilling a plurality of horizontal boreholes in a grid pattern.

DETAILED DESCRIPTION OF THE INVENTION

Horizontal Borehole Creation

Figure 1:
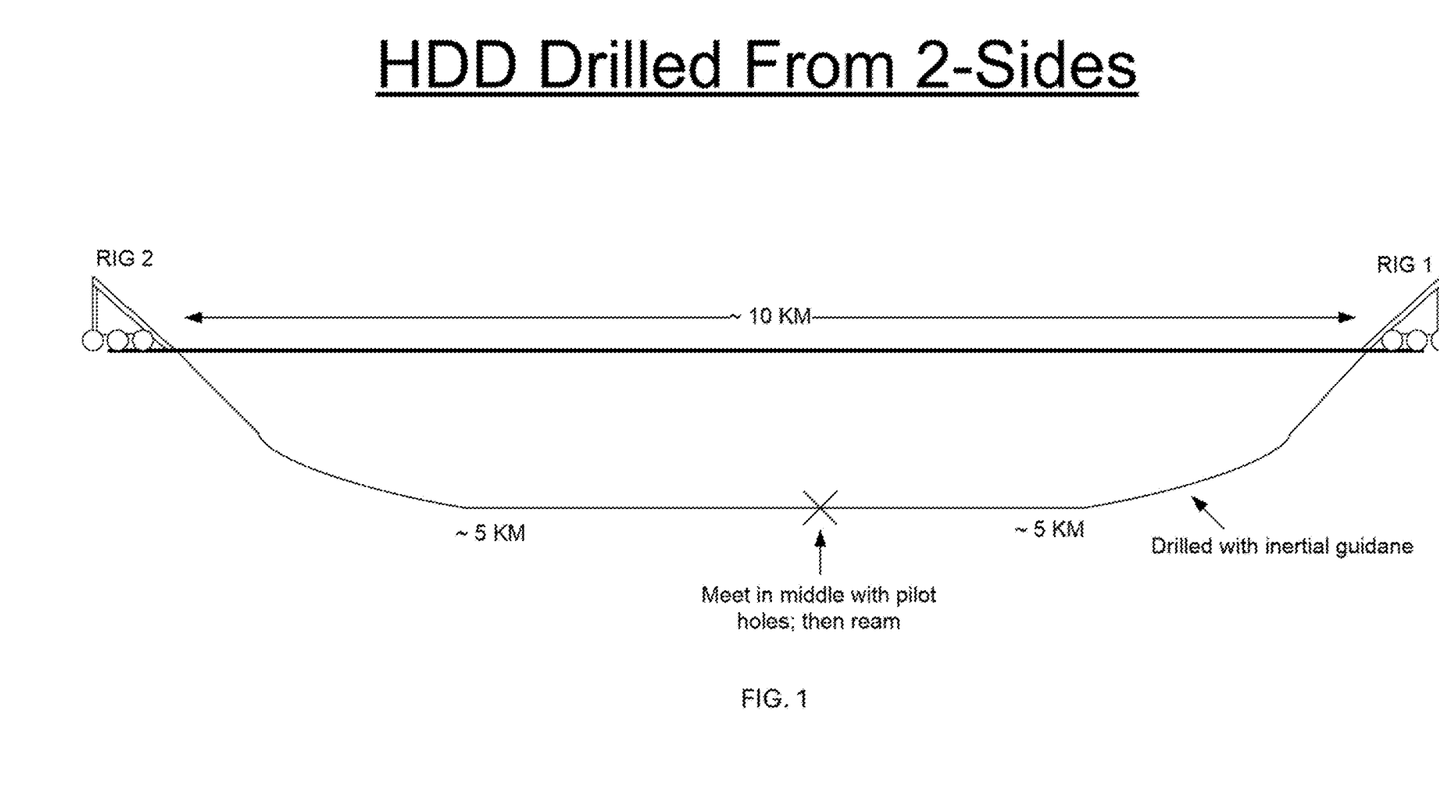
FIG. 1 is a schematic illustration of horizontal directional drilling (HDD) using "river crossing technology", according to embodiments of the present invention.
Figure 6:
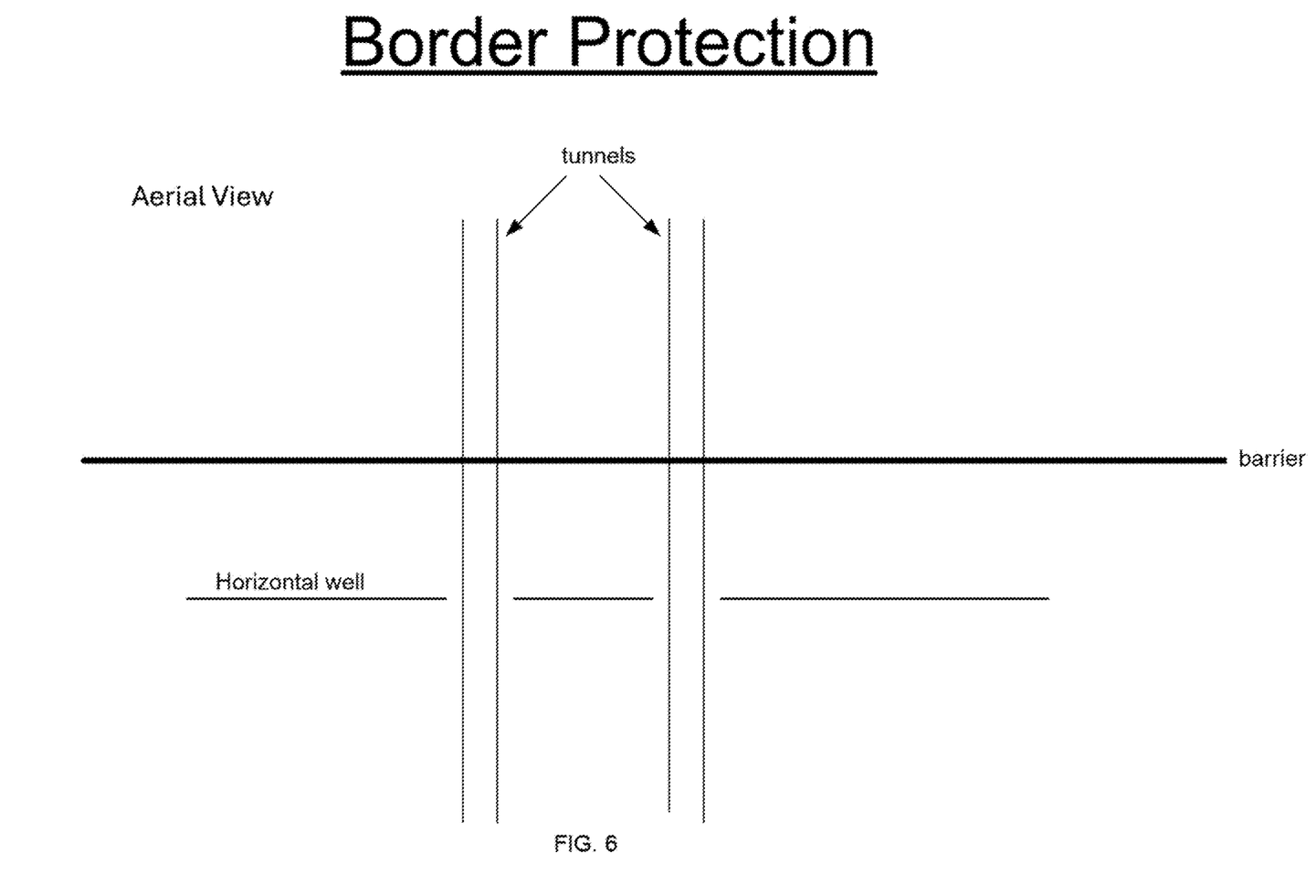
FIG. 6 is a schematic illustration of horizontal directional drilling across a border crossing, according to embodiments of the present invention.

According to embodiments, a horizontal borehole is drilled using techniques such as horizontal directional drilling (HDD) or micro-tunneling in a region where the presence of tunnels, conduits, and/or other subsurface structures or voids are suspected to exist. In some implementations in which a barrier such a natural feature (e.g., river), a man-made structure or a border crossing (e.g., as shown schematically in FIG. 6) is suspected to be traversed by a subsurface structure such as a tunnel or conduit, a rig can be drilled using "river crossing technology" such as that operated by Prime-Drilling, Germany and The Crossing Company, Alberta, Canada; a schematic illustration is shown in FIG. 1. These HDD wells are drilled routinely for pipelines and communications conduits in the U.S. and Canada, e.g., at depths under rivers exceeding 500 ft.

As is known in the art, the HDD can proceed from one end only or from both ends to meet in the middle (not necessarily the exact geographical middle). A typical HDD length may be 10 km; thus, an exemplary 14 km-long borehole may be drilled from two ends of 7 km length, as shown in FIG. 1. In an example, one end of the tunnel is located on an offshore drill rig or manmade island, while the other side is on land. The horizontal borehole diameter may be 12", 16", 24" or larger, and a pilot hole can be reamed to a larger diameter if needed.

The horizontal directional drilling can use a directional measurement subassembly such as the ParaTrack-2 system (Vector Magnetics) containing a 3-axis magnetometer and 2-axis accelerometer connected by wireline through the drill pipe to the surface. The HDD wells are easily tracked while drilling to about +0.3 m accuracy at 20 m depths or deeper using current loops laid out and surveyed on the surface. The current loops generate an AC magnetic field detected by the 3-axis magnetometers. An inertially-guided HDD subassembly is also available which does not require magnetic loops on the surface. This system guides the drilling process, ensuring the borehole remains at the desired depth and orientation and tracks a desired path or corridor.

Figure 7:
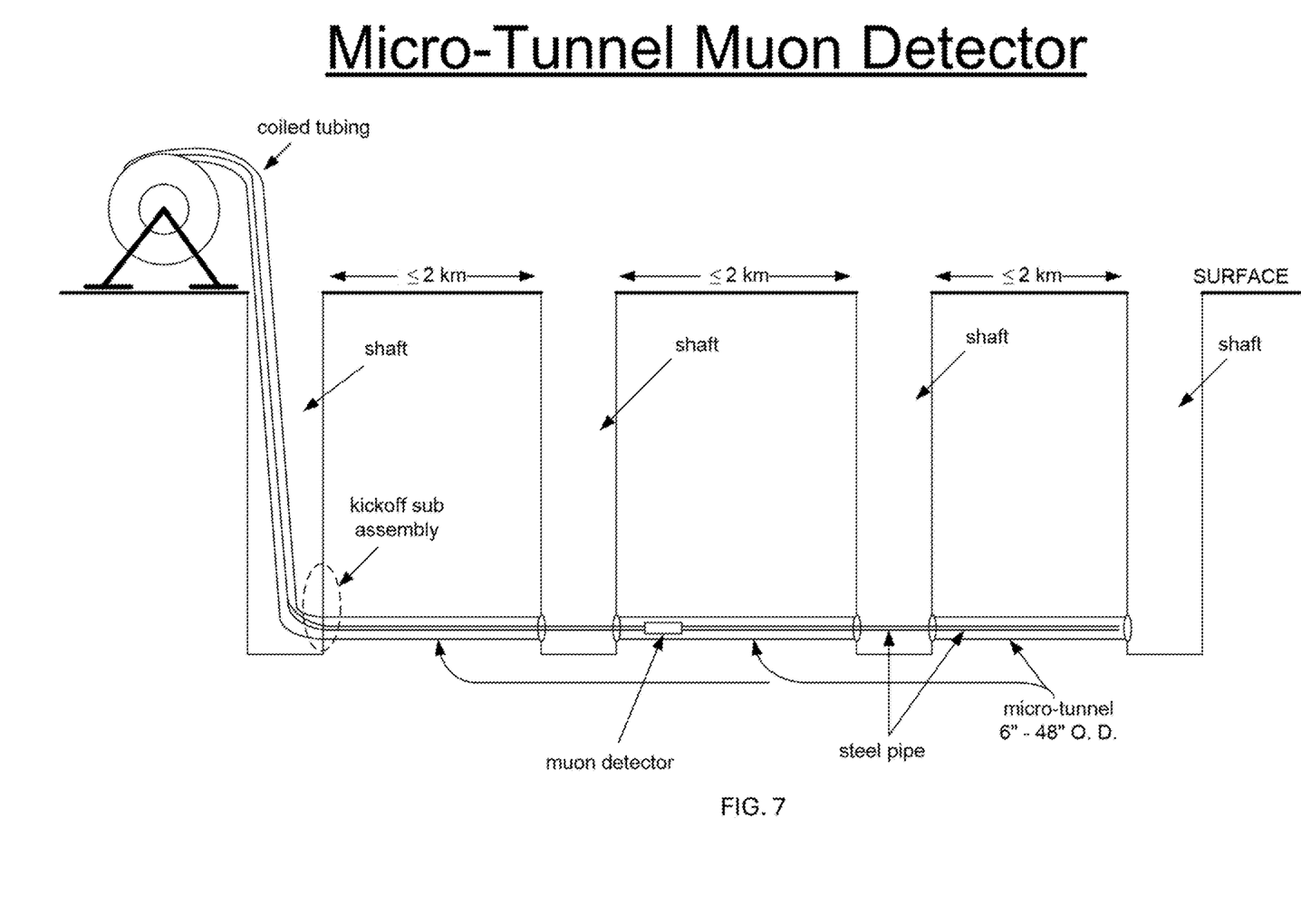
FIG. 7 is a schematic illustration of a muon detector array deployed using micro-tunneling, according to embodiments of the present invention.

Micro-tunneling (MT) is another tunneling technique known in the art that can be employed in the disclosed methods, i.e., instead of HDD. An exemplary muon detector deployed using micro-tunneling is illustrated in FIG. 7. An MT rig uses a laser guided system to achieve a level of precision that reaches cm-level accuracy; HDD at best can have one-tenth the precision. In some embodiments, the greater precision of MT is useful for the muon tomography application to avoid anomalies due to depth variations of the horizontal borehole. Another advantage of MT is enhanced ability to drill in unstable soils, such as loose sands and clays. At the time of this disclosure, commercially available MT rigs enable boreholes of up to 48-inch diameter so a large diameter muon detector bundle is deployable in the pipe.

Disadvantages of micro-tunneling include higher cost due to bigger crews, the need for boring a large diameter vertical shaft at both ends, and a maximum tunnel length of about 2 kilometers, although a series of vertical shafts can be bored about 2 kilometers apart to maintain the continuity of the horizontal borehole. Drilling the vertical shafts means that the MT techniques cannot be readily deployed in locations in which there are hindrances to boring the vertical shafts between the two endpoints.

The horizontal borehole is created, e.g., drilled or tunneled, at a depth beneath the conduits or tunnels so that muons will pass through the suspected subsurface structures and be detected by the muon detectors in the horizontal well. In some embodiments, a target depth of a target subsurface structure is selected, and the borehole is drilled below the target depth. The horizontal well may be lined with steel, non-magnetic stainless-steel, copper or fiberglass casing (i.e. cemented) or tubing to ensure the borehole's integrity and protection from potential tunnel collapse. The inner surface of the pipe may be coated to reduce friction and the outer surface may be coated to prevent corrosion. The borehole can be lined with an ordinary steel pipe which the muons will easily penetrate or other suitable materials such as non-magnetic stainless steel to maintain its structure. The horizontal well should be drilled sufficiently below the suspected or anticipated depth of the target conduit or tunnel (or any other subsurface structure) so that if the structure is later destroyed, e.g., by explosives, the horizontal well with casing or tubing will stay intact. For example, if the tunnels are located at about 20 m depth, the horizontal wellbore may be drilled at 50 m depth.

Muons have great depth penetration and can be used for radiographic or tomographic imaging of density variations to depths of at least 1 kilometer. This muon radiography or tomography method can be used successfully for much deeper tunnels than other methods.

If the horizontal well is cased and cemented, then standard oil well logging tools may also be used, such as the long-spaced acoustic reflection logging tool Baker Hughes XMAC, which uses acoustic reflections with multiple acoustic sensors. This could be used for confirmation purposes once the muon tomography has been performed. Magnetic, induction, electromagnetic, or gravity sensors may also be used.

Figure 2:
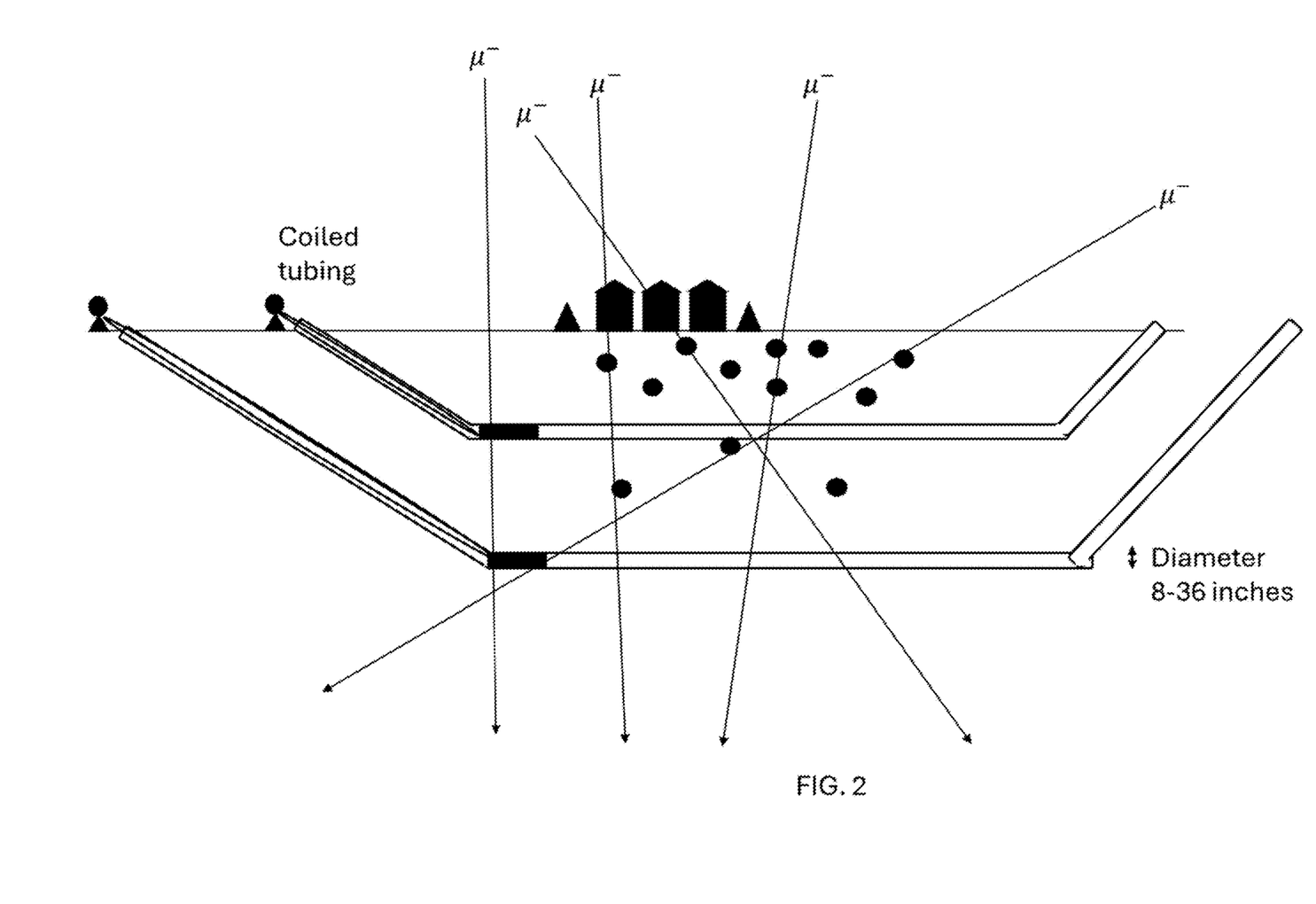
FIG. 2 is a schematic illustration of a dual horizontal well pair, according to embodiments of the present invention.

A dual horizontal (e.g., HDD) well pair as illustrated schematically in FIG. 2 may be used to detect tunnels over a wider range of possible depths if the deepest well tunnel depth is not known. For example, one HDD well may be located at 50 m depth and a second HDD well located below it at 80 m depth. This would enable detection of most tunnels in the 20-30 m depth with exceptionally deep tunnels at 70 m depth. Similarly, a dual horizontal well pair may be drilled by micro-tunneling with high accuracy.

Subsurface Construction

In embodiments, the disclosed methods include detecting subsurface infrastructure under construction that has not yet reached the horizontal borehole. In an example, a horizontal borehole is 50 m deep, and the muon detector unit(s) are able to just begin to detect an 'approaching' 25 m deep conduit when it is about sine (60 degrees)×(25/50)×50 m away. The 60 degrees comes from the maximum angle from the vertical of the muons from the cosmic rays. Thus, repeated muon logs of the horizontal well should be able to detect the approaching conduit before it reaches a barrier such as the barrier of FIG. 6.

Muon Detector Configuration

Within the horizontal borehole, multiple muon detector units are linearly arranged. Each muon detector may be tubular in shape, configured as a bundle of scintillators and drift tubes where the drift tubes have a centrally located anode wire and a Vernier-shaped cathode, as described in US patent publication 2024/0004102 A1, the teachings of which are incorporated herein by reference. Alternatively, each muon detector may consist of a GEM muon detector with electron multiplication, such as those used in high energy particle accelerators. Other types of muon detectors are known in the art.

This configuration allows for a comprehensive measurement of muon flux in different directions, enhancing the detection sensitivity to subsurface anomalies when the data is inverted and tomographically reconstructed, as is well known in the art. Additional detector units in a linear array along the horizontal borehole also allow faster logging speeds and improved resolution. There may be, for example, 3, 6, 10 or more detector units at uniform 1 meter spacing between units. The muon flux is about 10,000 muons per square meter per minute at the surface, so the additional detectors allow better statistical reliability and wider aperture for more accurate tomographic reconstruction. An exemplary logging speed in a horizontal well at 50 m depth may be about 1 meter per minute with a single detector unit.

Detector Array Deployment

Figure 3:
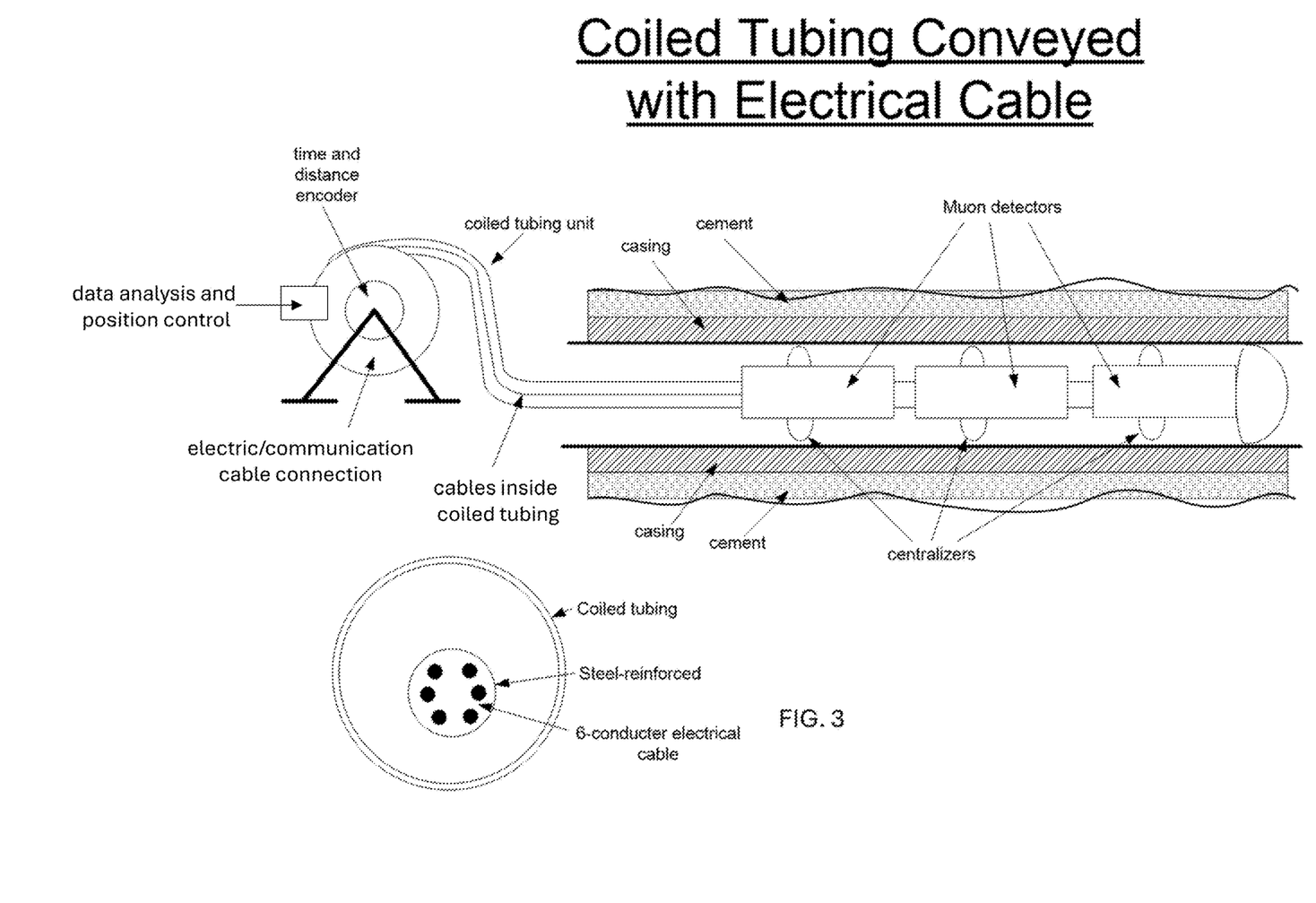
FIG. 3 is a schematic illustration of a detector array deployment using the coiled tubing method, according to embodiments of the present invention.
Figure 5:
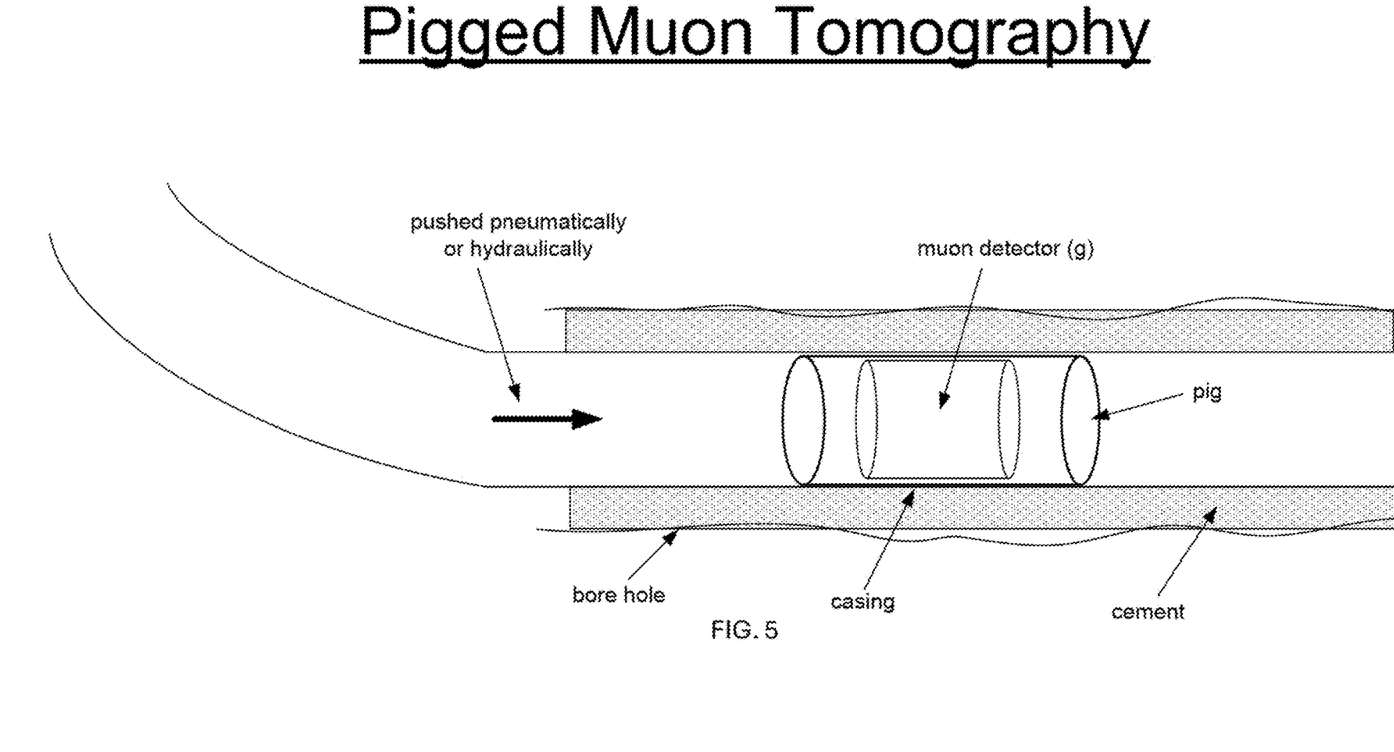
FIG. 5 is a schematic illustration of a muon detector array deployed using a pigged set-up, according to embodiments of the present invention.

In embodiments, the muon detector array (sonde) is deployed into the horizontal borehole using coiled tubing, drill pipe, or a pipeline inspection gauge (pig) driven pneumatically or hydraulically. The coiled tubing method, as schematically illustrated in the non-limiting example of FIG. 3, involves conveying the detector sonde through the borehole in both directions and is capable of real-time data acquisition, while the pigging method allows for the sonde to be collected at either end of the borehole and the data downloaded into a computer system. Some methods of moving the muon sonde in the horizontal well include the following:
1. Logging-While-Drilling (LWD)
2. Wireline conveyed from either exit side of the horizontal well
3. Pipe or coiled tubing-conveyed
4. Pigged through the horizontal borehole liner or casing using a sliding rubber pushed by hydraulic or pneumatic fluid. A schematic drawing of a pigged set-up is shown in FIG. 5.

Figure 4:
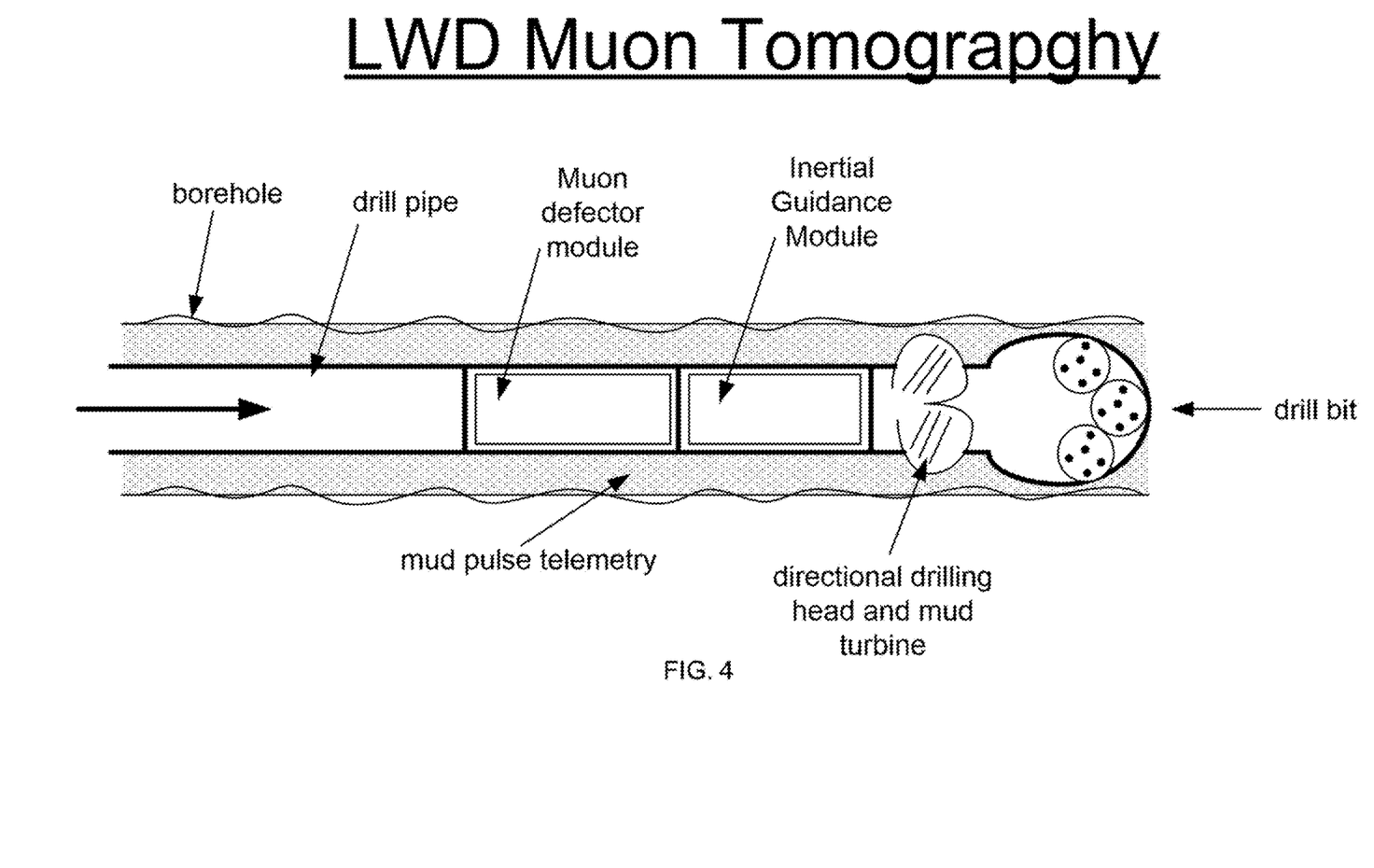
FIG. 4 is a schematic illustration of a logging-while-drilling (LWD) set-up according to embodiments of the present invention.

The LWD method is relatively slow, thus enabling high quality muon flux data to be acquired during the drilling process. A schematic drawing of an LWD set-up is shown in FIG. 4.

After the initial open hole logs, the horizontal well logs can be repeated periodically (e.g. monthly) to detect new subsurface construction in a target region higher than, i.e., less deep than, the borehole. Changes with a characteristic ~1 m lateral signature relative to a base log clearly show new subsurface construction. Muon logging may be performed while pushing in and while pulling out.

In embodiments, the muon flux data is stored in an onboard data collection system, together with time and GPS location. The coiled tubing also records the length of coiled tubing in the horizontal borehole at a given time. When the muon flux data is downloaded for data analysis, the location of the detector array is known.

The muon detector array is advanced by coiled tubing through the horizontal borehole at a rate determined by the detected muon flux, the geometry of the tunnels, and their depth. Slower logging rates allow more muon detections and higher statistical accuracy for better resolution spatial resolution of the subsurface structures. Bigger subsurface structures are easier to resolve and thus a faster logging speed may be used. A typical logging speed with a single detector may be about 1 meter per minute; in an example, it can take several days to log the abovementioned exemplary 14-km wide corridor.

In implementations in which coiled tubing is utilized, the muon data can be recorded in real time by using an electrical cable located inside the coiled tubing unit and connected to a computer acquisition system at one end of the borehole. The electrical cable can be a standard 6-conductor wireline logging cable where each of the 6 conductors transmit data from one of six muon detectors in the linear array.

Muon Detection and Data Analysis

The muon detectors within the array are designed to detect muons with very high energies ranging from 10 GeV to 1 TeV. This energy range has great penetration and eliminates most of the background radiation, for example, from the potassium, and thorium decay gamma rays emitted from naturally occurring clays or uranium decay products in organic matter. The muon flux data collected by these detectors are analyzed to identify variations in muon flux caused by subsurface anomalies. Tunnels and conduits, having virtually zero density compared to the surrounding soil and rock with densities~1-3 g/cc, will allow more muons to pass through, creating detectable anomalies in the muon flux measurements. For example, with the horizontal well at 50 m depth and a 2 m height of tunnel, the anomaly may be about 2/50=4%. The measurements allow muon flux at different entry angles to be utilized for tomographic reconstruction using a variety of tomography inversion algorithms, suitable examples of which are known in the art. The reconstructed image shows the location and depth of the tunnel or conduit and its shape and size. The tomographic reconstruction helps distinguish a tunnel or conduit from a natural subsurface void.

The existence of multiple known subsurface structure locations along a corridor, e.g., utility conduits, can enable detection of a certain muon tomography signature characteristic of the type of structure. This can also be useful for fine tuning the tomography inversion algorithm for maximum accuracy.

Preservation of Borehole Integrity and Well Logging

The borehole is cased with steel pipe, non-magnetic stainless-steel pipe, copper pipe, fiberglass pipe or another durable material to maintain its integrity and prevent collapse, especially in areas where tunnel destruction might later occur. This casing ensures the longevity and reliability of the muon detection HDD system. Casing the borehole also allows standard oilfield logging tools to make additional geophysical measurements, such as acoustic reflection, magnetics (if non-magnetic stainless steel or fiberglass is used), electrical induction and electromagnetics (if fiberglass is used), or gravity.

The invention claimed is:

1. A method for detecting a subsurface structure, the method comprising:
 a. creating a horizontal borehole by tunneling or drilling;
 b. deploying an array of one or more muon detector units within the horizontal borehole;
 c. detecting muons characterized by respective energies ranging from 10 GeV to 1 TeV using the deployed muon detectors; and
 d. analyzing flux of the detected muons to detect a subsurface structure located at a lesser depth than a depth of the borehole,
 where the borehole depth is selected to be sufficiently displaced vertically from the target depth of the target subsurface structure to reduce interference from surface activities and environment noise, and to allow for destruction of the target subsurface structure without damaging the horizontal borehole.

2. The method of claim 1, additionally comprising: selecting a target depth of a target subsurface structure, wherein the creating of the horizontal borehole is at a borehole depth below the target depth.

3. The method of claim 2, wherein the creating includes HDD and/or microtunneling, and the drilling includes (i) drilling or tunneling a coplanar pair of horizontal boreholes at different respective borehole depths below the target depth, and (ii) deploying a respective array of muon detector units in each of the boreholes.

4. The method of claim 1, wherein the creating comprises horizontal directional drilling (HDD).

5. The method of claim 1, wherein the creating comprises tunneling or micro-tunneling.

6. The method of claim 1, additionally comprising: deploying tubing and/or casing within the borehole.

7. The method of claim 6, wherein the horizontal borehole is cased with steel pipe, non-magnetic stainless steel, copper, fiberglass, or another suitable material to preserve borehole integrity and allow oilfield logging.

8. The method of claim 6, wherein data from the muon detectors is stored in one or more onboard systems and/or transmitted to a surface processing unit in real-time, using a multi-conductor electrical cable within the casing and/or tubing or coiled tubing.

9. The method of claim 6, wherein the casing and/or tubing comprises a material selected based on specific geological conditions of the subsurface environment.

10. The method of claim 1, wherein the detected subsurface structure is a tunnel or a conduit.

11. The method of claim 1, wherein the muon detector array is deployed using at least one of logging-while-drilling, coiled tubing conveyed, wireline-conveyed, drill pipe conveyed, and a pipeline inspection gauge (pig).

12. The method of claim 11, wherein the muon detector array is deployed using a pig, and the using of the pig includes providing access to collect a respective detector sonde at either end of the horizontal borehole.

13. The method of claim 1, wherein the creating comprises drilling the horizontal borehole from two ends and meeting between the two ends.

14. The method of claim 1, wherein the creating includes HDD and the drilling includes using a ParaTrack-2 guidance system with a magnetic coil on the surface to guide the drilling of the horizontal borehole or using an inertial guidance system.

15. The method of claim 1, wherein the array of one or more muon detector units comprises a plurality of spaced-apart muon detector units.

16. The method of claim 1, further comprising: enhancing detection accuracy by using a high-resolution tomographic data inversion algorithm.

17. The method of claim 1, wherein the one or more muon detectors are calibrated to account for variations in muon flux due to changes in atmospheric conditions.

18. The method of claim 1, further comprising using a coiled tubing unit to deploy and retrieve the muon detector array in a remote or inaccessible area.

19. The method of claim 1, wherein the muon detectors are resistant to high pressures of deep subsurface environments.

20. The method of claim 1, further comprising: integrating use of the one or more muon detector units with at least one other geophysical surveying technique.

21. The method of claim 1, wherein the muon detectors are equipped with shielding to protect against background radiation and/or other sources of interference.

22. The method of claim 1, further comprising: using a coiling tubing unit with communication cables for real time positioning to adjust the positioning of the muon detectors based on real-time data analysis.

23. The method of claim 1, wherein the muon detector units are powered by a self-sustaining energy source to ensure continuous operation over extended periods.

24. The method of claim 1, additional comprising: using a central monitoring station for coordinated analysis and decision-making to detect a subsurface structure.

25. The method of claim 1, further comprising: deploying at least one additional sensor selected from acoustic, magnetic, induction, electromagnetic and gravity sensors, alongside muon detectors.

26. The method of claim 1, wherein the creating includes HDD and/or microtunneling, and the drilling or tunneling includes (i) drilling or tunneling a coplanar pair of horizontal boreholes at different respective borehole depths, and (ii) deploying a respective array of muon detector units in each of the boreholes, wherein the detected subsurface structure is at a lesser depth than either of the boreholes.

27. The method of claim 1, wherein the drilling includes drilling a plurality of wells with a parallel horizontal section located substantially above each other.

28. A method for detecting a subsurface structure, the method comprising:
   a. creating a horizontal borehole by tunneling or drilling:
   b. deploying an array of one or more moon detector units within the horizontal borehole,
   c. detecting muons characterized by respective energies ranging from 10 GeV to 1 TeV using the deployed muon detectors, and
   d. analyzing flux of the detected muons to detect a subsurface structure located at a lesser depth than a depth of the borehole, wherein the detecting of the subsurface structure includes detecting a subsurface structure under construction before the subsurface structure reaches a vertical plane intercepting a muon detector unit of the array of one or more muon detector units.

29. The method of claim 28, further comprising: enhancing the detection and/or depth accuracy by using a high-resolution tomographic data inversion algorithm using data from both boreholes.

* * * * *